United States Patent
Pueschl et al.

(10) Patent No.: US 12,027,052 B2
(45) Date of Patent: Jul. 2, 2024

(54) COMPUTER-IMPLEMENTED METHOD FOR DETERMINING SIMILARITY VALUES OF TRAFFIC SCENARIOS

(71) Applicant: dSPACE GmbH, Paderborn (DE)

(72) Inventors: Thorsten Pueschl, Paderborn (DE); Andre Rossi, Paderborn (DE)

(73) Assignee: DSPACE GMBH, Paderborn (DE)

( * ) Notice: Subject to any disclaimer, the term of this patent is extended or adjusted under 35 U.S.C. 154(b) by 271 days.

(21) Appl. No.: 17/546,099

(22) Filed: Dec. 9, 2021

(65) Prior Publication Data

US 2022/0223047 A1    Jul. 14, 2022

(30) Foreign Application Priority Data

Jan. 12, 2021    (DE) .................... 10 2021 100 395.4

(51) Int. Cl.
*G08G 1/16* (2006.01)
*B60W 30/09* (2012.01)
(Continued)

(52) U.S. Cl.
CPC .............. *G08G 1/166* (2013.01); *B60W 30/09* (2013.01); *B60W 30/12* (2013.01);
(Continued)

(58) Field of Classification Search
CPC ....... G08G 1/166; G08G 1/167; B60W 30/09; B60W 30/12; B60W 2520/10;
(Continued)

(56) References Cited

U.S. PATENT DOCUMENTS

| 6,915,241 B2 | 7/2005 | Kohlmorgen et al. |
|---|---|---|
| 9,434,389 B2 | 9/2016 | Harsham et al. |

(Continued)

FOREIGN PATENT DOCUMENTS

| DE | 102008061910 A1 | 9/2009 |
|---|---|---|
| DE | 102017200180 A1 | 7/2018 |

(Continued)

OTHER PUBLICATIONS

Wolschke Christian et al: "Observation Based Creation of Minimal Test Suites for Autonomous Vehicles", 2017 IEEE International Symposium on Software Reliability Engineering Workshops (ISSREW), IEEE, 23. Oct. 2017 (Oct. 23, 2017), pp. 294-301, XP033255396, Retrieved from IDS Provided May 17, 2022 (Year: 2017).*

(Continued)

*Primary Examiner* — Jason Holloway
*Assistant Examiner* — Benjamin J Brosh
(74) *Attorney, Agent, or Firm* — LEYDIG, VOIT & MAYER, LTD.

(57) ABSTRACT

A method for determining similarity values of traffic scenarios based on movement profiles of traffic participants in the traffic scenarios includes: generating, by a test device, at least one movement profile of a traffic participant using measurement data, wherein the at least one movement profile comprises at least one movement element, and wherein a new segment in the at least one movement profile begins with a change of a movement element; generating, by the test device, a sequence of the at least one movement profile for an ego vehicle and/or a fellow vehicle of a traffic scenario, wherein a sequence change is generated based on a segment being changed for a movement element; determining, by the test device, a measure of similarity based on movement profiles from at least two traffic scenarios by (Continued)

comparing respective sequences created from the movement profiles; and providing the measure of similarity.

10 Claims, 4 Drawing Sheets

(51) Int. Cl.
    *B60W 30/12*     (2020.01)
    *G06F 11/36*     (2006.01)
    *G06F 18/214*     (2023.01)
    *G06F 18/22*     (2023.01)

(52) U.S. Cl.
    CPC ........ *G06F 11/3684* (2013.01); *G06F 18/214* (2023.01); *G06F 18/22* (2023.01); *G08G 1/167* (2013.01); *B60W 2520/10* (2013.01); *B60W 2554/4041* (2020.02); *B60W 2554/4042* (2020.02); *B60W 2554/4043* (2020.02)

(58) Field of Classification Search
    CPC . B60W 2554/4041; B60W 2554/4042; B60W 2554/4043; B60W 2554/408; B60W 2554/406; G06F 11/3684; G06F 18/214; G06F 18/22
    See application file for complete search history.

(56) References Cited

U.S. PATENT DOCUMENTS

| | | | |
|---|---|---|---|
| 11,086,318 B1* | 8/2021 | Davis | G05D 1/0257 |
| 2014/0013205 A1 | 1/2014 | Mikhaiel et al. | |
| 2019/0340542 A1 | 11/2019 | Wu et al. | |
| 2021/0339772 A1* | 11/2021 | Ramamoorthy | G06F 18/295 |
| 2022/0237889 A1* | 7/2022 | Beglerovic | G06T 11/203 |
| 2023/0343153 A1* | 10/2023 | Schlömicher | B60W 40/10 |

FOREIGN PATENT DOCUMENTS

| | | |
|---|---|---|
| EP | 3557549 A1 | 10/2019 |
| WO | 2017030878 A1 | 2/2017 |
| WO | 2018172849 A1 | 9/2018 |
| WO | 2019199878 A1 | 10/2019 |

OTHER PUBLICATIONS

Wolschke Christian et al: "Observation Based Creation of Minimal Test Suites for Autonomous Vehicles", 2017 IEEE International Symposium on Software Reliability Engineering Workshops (ISSREW), IEEE, Oct. 23, 2017 (Oct. 23, 2017), Seiten 294-301, XP033255396, DOI: 10.1109/ISSREW.2017.46 [gefunden am Nov. 14, 2017] * III.C Maneuver Similarity Comparison*.

* cited by examiner

COMPUTER-IMPLEMENTED METHOD FOR DETERMINING SIMILARITY VALUES OF TRAFFIC SCENARIOS

CROSS-REFERENCE TO PRIOR APPLICATIONS

This application claims benefit to German Patent Application No. DE 10 2021 100 395.4, filed on Jan. 12, 2021, which is hereby incorporated by reference herein.

FIELD

The present invention relates to a computer-implemented method for determining similarity values of traffic scenarios by determining movement profiles of traffic participants in the traffic scenarios.

The present invention further relates to a test unit (e.g., a test device) for determining similarity values of traffic scenarios. The present invention further relates to a computer program and a machine-readable data carrier.

BACKGROUND

Driving assistance systems, such as an adaptive cruise control and/or functions for highly automated driving, can be verified or validated with the aid of various checking methods. In particular, hardware-in-the-loop methods, software-in-the-loop methods, simulations and/or test drives can be used.

The effort, in particular the time and/or cost expended, for testing such vehicle functions using the aforementioned verification methods is typically very high, because a large number of potential driving situations must be tested.

Testing an at least partially autonomous means of transportation exclusively on the road with driving distances over billions of kilometers is not possible for reasons of time and expense. In addition, many redundant test miles would result, while critical and unusual situations, which are nevertheless relevant to the capabilities of the at least partially autonomous vehicle, would not occur.

This can lead in particular to a high outlay for test drives as well as for simulations. DE 10 2017 200 180 A1 indicates a method for verifying and/or validating a vehicle function, which is provided for autonomously guiding a vehicle in the longitudinal and/or transverse direction.

The method comprises determining a test control instruction of the vehicle function to an actuator of the vehicle on the basis of environmental data relating to an area surrounding the vehicle, wherein the test control instruction is not implemented by the actuator.

The method further comprises simulating, on the basis of environmental data and using a traffic participant model relating to at least one traffic participant in the area surrounding the vehicle, a notional traffic situation that would be present if the test control instruction had been implemented.

The method further comprises providing test data relating to the notional traffic situation. In order to determine the test control instruction, the vehicle function is operated passively in the vehicle.

A disadvantage of this method is that an actual operation of the vehicle is required to determine the required data in order to verify and/or validate the vehicle function.

The manufacturers of at least partially autonomous means of transportation require a parallelized, simulation-based solution. The "scenario-based testing" test method applies here. However, any scenario to be tested here also requires time and, therefore, expense. The manufacturers of at least partially autonomous means of transportation have databases with thousands of scenarios, in which duplicates or very similar scenarios accumulate over the course of time. In addition, new data for generating further scenarios are also continuously collected through test drives, wherein it cannot be immediately determined whether already comparable scenarios have been stored in a database. Even with a massive parallelization, testing of all scenarios is too time-consuming.

SUMMARY

In an exemplary embodiment, the present invention provides a method for determining similarity values of traffic scenarios based on movement profiles of traffic participants in the traffic scenarios. The method includes: generating, by a test device, at least one movement profile of a traffic participant using measurement data, wherein the at least one movement profile comprises at least one movement element, wherein the at least one movement element comprises at least one of a lateral movement element, a longitudinal movement element, a position parameter, or a distance parameter, and wherein a new segment in the at least one movement profile begins with a change of a movement element; generating, by the test device, a sequence of the at least one movement profile for an ego vehicle and/or a fellow vehicle of a traffic scenario, wherein a sequence change is generated based on a segment being changed for a movement element; determining, by the test device, a measure of similarity based on movement profiles from at least two traffic scenarios by comparing respective sequences created from the movement profiles; and providing, by the test device, the measure of similarity.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
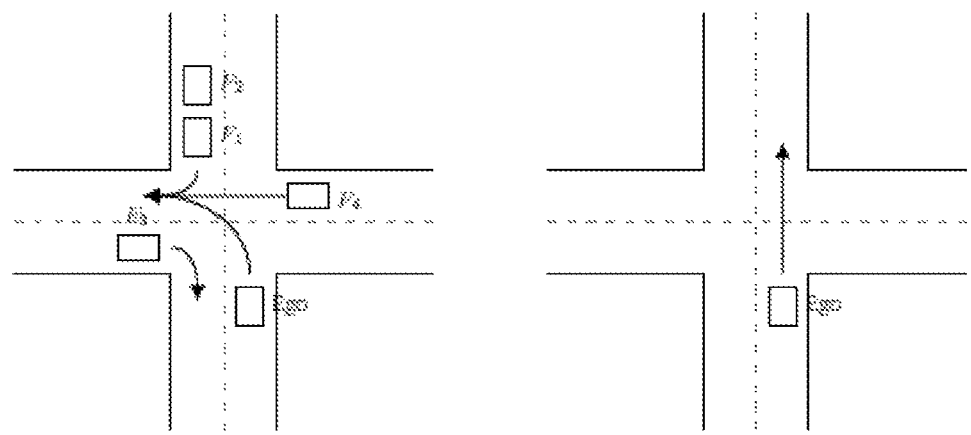
FIG. 1 shows a schematic representation for differentiation of scenarios according to the invention.

In an embodiment of the invention, similar scenarios are identified in order to logically determine scenarios to be tested and/or to decide which scenarios are to be generated on the basis of the raw data collected through test drives. Raw data can include all data, such as camera, lidar and radar data, but also GPS information.

Exemplary embodiments of the invention to provide a method, a test unit, a computer program and a machine-readable data carrier that can efficiently determine similarities of scenarios within the framework of a scenario-based testing for systems and system components in highly automated driving.

Exemplary embodiments of the invention provide a computer-implemented method for determining similarity values of traffic scenarios through movement profiles of traffic participants in the traffic scenarios, a test unit, a computer program, and a machine-readable data carrier.

In the scenario-based testing of systems and system components for the autonomous guidance of a motor vehicle, scenarios that can be referred to as an abstraction of a traffic situation are defined. Test cases can then in turn be carried out for each scenario. A logical scenario in this case is the abstraction of a traffic situation with the road, the driving behavior and the surrounding traffic without specifying specific parameter values. By selecting specific parameter values, a specific scenario is obtained from the logical scenario. Such a specific scenario corresponds to a respective individual traffic situation.

A scenario in this case describes the chronological progression of scenes that start with a starting scene. In contrast to scenes, scenarios cover a certain period of time. A single scene can be regarded as a snapshot of the surroundings, which comprise the setting, dynamic elements and all participants. The participants and in particular the vehicles of a scene.

For the fundamental differentiation of the traffic scenarios or scenarios according to the invention, the movements of the traffic participants are considered. Thus, it is not static parameters, such as the surroundings, built environment or road width, that are used for the differentiation, but in particular the driving behavior of the individual traffic participants. The movements of the traffic participants and thus the driving behavior is described by trajectories. Trajectories describe a path in both spatial and chronological directions. A movement profile can be created using the description of the movements/trajectories of a traffic participant.

According to the invention, the similarity between two scenarios is evaluated on the basis of the movement profiles of the traffic participants.

An autonomous driving function is realized by a system, for example a control unit (e.g., a controller). The control unit is conventionally tested in the actual vehicle in real traffic situations, validated by hardware-in-the-loop tests or alternatively by completely virtual tests.

Using the present method, a so-called cut-in scenario, for example, can be differentiated from other scenarios. The cut-in scenario can be described as a traffic situation, with which a highly automated or autonomous vehicle is driving in a specified lane and another vehicle cuts into the lane of the ego vehicle from a different lane within a certain distance at a lower speed than the ego vehicle. The ego vehicle here refers to the vehicle to be tested.

The speed of the ego vehicle and of the other vehicle, which is also referred to as a fellow vehicle, is constant in this case. Since the speed of the ego vehicle is higher than that of the fellow vehicle, the ego vehicle must be braked in order to avoid a collision of the two vehicles. However, a cut-in scenario can also be present in different embodiments, for example due to the difference in the speed of the traffic participants.

Furthermore, a scenario is possible in which the ego vehicle represents the passing vehicle, so that the ego vehicle is traveling in a predetermined lane and passes another vehicle traveling at a lower speed than the ego vehicle. In doing so, the ego vehicle changes to/cuts over to another lane and travels past the fellow vehicle at a higher speed. The speed of the ego vehicle does not have to be constant in this scenario. After the ego vehicle has driven past the fellow vehicle, the ego vehicle cuts back into the previous lane.

The similarity values identified according to the method or a measure of similarity of scenarios advantageously make it possible to select different scenarios for validation within the framework of virtual tests of the control unit and/or to identify the raw data that can be used to generate possibly different scenarios. The method according to the invention thus makes it possible to more efficiently validate control units for autonomously guiding vehicles or other manners of transportation.

Further embodiments are described below with reference to the figures.

The test unit is configured to provide a measure of similarity for traffic scenarios to be tested for tests of a device for at least partially autonomous guidance of vehicles or other manners of transportation.

According to a further aspect of the invention, a computer program with program code is furthermore provided in order to carry out a method according to the invention when the computer program is executed on a computer. According to a further aspect of the invention, a data carrier with program code (e.g., a non-transitory computer-readable medium having processor-executable instructions stored thereon) is provided in order to carry out a method according to the invention when the program code is executed on a computer.

Features of a method described herein can be used to identify a measure of similarity between different scenarios or driving situations. A test unit (e.g., a test device) according to the invention is likewise suitable for testing a plurality of different devices or control devices of, for example, automobiles, utility vehicles, commercial vehicles, ships and/or aircraft for the purpose of performing a test run on the basis of the similarity values of a plurality of different scenarios or driving situations.

The focus in determining similarity is in this case on the movement profiles of the traffic participants of the scenario. The chronological sequence of individual movement elements of a movement profile is a component in determining the similarity between the scenarios. According to the invention, four different movement elements are used for describing the movement profile. The aforementioned movement elements are naturally not exhaustive and can be expanded within the meaning of the invention. The movement elements for describing a movement profile comprise at least one of the elements:

lateral movement,
longitudinal movement,
position parameter, and/or
distance parameter.

Lateral movement describes the movement of a vehicle in the lateral direction of movement. The maneuvers "lane change to the left," "lane change to the right," and "lane keeping maneuver" cause, among other things, a lateral movement. The lane change occurs when, for example, an ego vehicle is traveling in a predetermined lane and then leaves the lane in the corresponding direction. In lane keeping, the lane is accordingly kept by, for example, the ego vehicle.

Longitudinal movement describes the movement of a vehicle in the longitudinal direction. In this case, the speed of the vehicle is calculated from an S coordinate in order to describe the movement in the longitudinal direction. Starting from a reference line of a road, the so-called SD coordinate system of the road segment can be described. The S coordinate describes the distance of a point on the road from the starting point of the segment along the reference line, and the D coordinate is defined as the distance in the lateral direction from the reference line. Longitudinal movements, such as constant speed and/or acceleration and/or braking, can thus be determined and used for comparison. The examples given are not to be considered exhaustive.

For a distance parameter, the distance between a fellow vehicle and the ego vehicle is described. For example, a division into three classes is possible, such as, for example, area directly surrounding the ego vehicle, medium perimeter surrounding the ego vehicle, and further away perimeter surrounding the ego vehicle. However, other divisions are also possible for embodiments of the invention.

For a position parameter, the position at which a fellow vehicle is located relative to the ego vehicle and also the number of fellow vehicles are specified. Here as well, a division of the area surrounding the ego vehicle is provided.

Overall, the movement profile of a vehicle is described by the four named movement elements over the entire chronological progression of the scenario. Each of the movement elements comprises one or more segments, so that, when one of the movement elements is changed, a new segment starts for the movement element. For example, longitudinal movement for the movement element can first be assumed to be acceleration, then a constant speed and ultimately braking in a scenario. According to the invention, a new segment starts for each change.

Since the segmentation of the position and distance parameters is carried out only for the fellow vehicles relative to the ego vehicle, these parameters do not exist for the ego vehicle. For comparing the movement profiles of ego vehicles, the positions and distances of fellow vehicles are important, because this greatly influences the behavior of the ego vehicle.

According to the invention, a sequence through all movement elements is then created from the segments of the individual movement elements. A new sequence segment in the sequence is started for each segment in a movement element. Via the description with a sequence, the different, successive and constituent movements/movement elements that a vehicle can carry out in a scenario can be described in their chronological sequence.

In order to determine the similarity between two scenarios and thus between two sequences created from the movement profiles of two vehicles, the calculation of an edit distance (normalized weighted edit distance) is provided according to the invention.

Just like the edit distance, which calculates the similarity between two character sequences as a minimum sum of edit operations for converting one character sequence into another character sequence, the edit distance for sequences from movement profiles describes the similarity between two scenarios as a minimum sum of edit operations for converting one sequence into another sequence.

The edit distance calculates the similarity and thus also a measure of similarity between the two sequences S1 and S2 from two corresponding traffic scenarios. With S1, the state i from sequence S1 is indexed, and with S2, the state j from sequence S2 is indexed. The following difference equation is defined for the edit distance:

$$D(i, j) = \min \begin{cases} D(i-1, j) + d(S_{1,i-1}, S_{1,i}) + \lambda & \text{Deletion} \\ D(i, j-1) + d(S_{2,j-1}, S_{2,j}) + \lambda & \text{Insertion} \\ D(i-1, j-1) + d(S_{1,i-1}, S_{2,j-1}) & \text{Replacement} \end{cases}$$

(i,) is an element of a table in which the intermediate results of calculating the costs of the edit operations between the two states i and j of the two sequences are stored. The parameter $\lambda$ generates the costs that arise from carrying out a delete or insert operation and is defined as a constant value. $\lambda$ can be considered as a constraint parameter that is intended to limit the use of delete or insert operations. For calculating the costs between two states of the two sequences, the following function:

$$d(Si,S'j) = wMa*dMa(Si,S'j) + wGe*dGe(Si,S'j) + wDi*dDi(Si,S'j) + wPo*dPo(Si,S'j)$$

has been defined. The function is a weighted sum of the costs that are generated between the individual classes of the two states, S1, and S2, to be compared. Each of the functions d(Si,S'j), dGe(Si,S'j), dDi(Si,S'j) and dPo(Si,S'j) has been defined such that the maximum costs arising between two classes of a movement element are normalized to 1. The maximum costs are used if the classes of the movement element differ. For example, in the calculation of the costs between two states of the "lateral movement" d(S1,i,S2,j) movement element, the maximum costs result if the class of lateral movement from state S1,i, is "lane change to the left" and the class of lateral movement from state S2,j, is "lane keeping." If the classes of lateral movement of both states are the same, the costs are determined by cost functions. These are based on features of the respective classes. For example, in the case of the classes "lane change to the left or right" of the lateral movement, this feature is the duration of the lane change.

FIG. 1 shows a schematic representation of the differentiation of traffic scenarios ($S_1$ to $S_n$) according to the invention. For this purpose, FIG. 1 shows an intersection scenario with a different number of fellow vehicles ($F_1$-$F_n$). In the first scenario on the left side in FIG. 1, a left-handed turning maneuver of the ego vehicle (Ego) is shown with 4 fellow vehicles ($F_1$-$F_4$) that are also driving through the intersection area. In the second scenario on the right side in FIG. 1, the ego vehicle (Ego) is traversing straight through the intersection area without being affected by fellow vehicles. Despite the same road architecture, peripheral built environment and curves, the two scenarios differ significantly, also with respect to movement elements of the traffic participants. While different lateral movement elements that describe the turning maneuver are contained within the left-side scenario, the lateral movement element "lane keeping" is predominantly relevant in the right-side scenario. Longitudinal movement elements also differ in the two traffic scenarios. The left-side scenario requires braking in order to be able to safely perform the turning maneuver. A constant speed can be expected in the right-side scenario. Moreover, no distance and position parameters can be acquired in the right-side scenario because no fellow vehicles are included in this scenario.

Different sequences are thus generated for the ego vehicles (Ego) in the left-side and right-side scenarios in FIG. 1, for example, so that no similarity can be determined when comparing the sequences.

Figure 2:
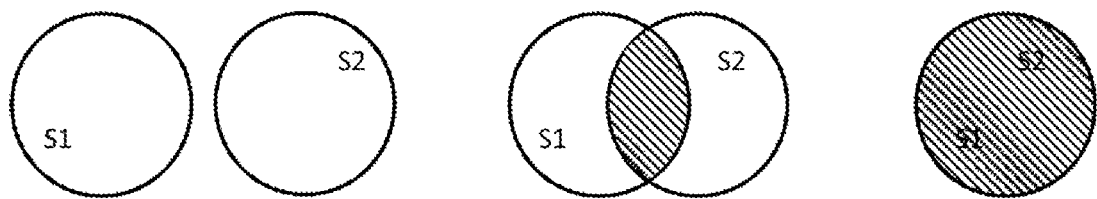
FIG. 2 shows a schematic representation for differentiation of scenarios according to the invention.

FIG. 2 shows a further schematic representation for differentiation of scenarios (e.g., $S_1$ to $S_n$) according to the invention. According to FIG. 2, two scenarios $S_1$ and $S_2$ may be completely different with respect to the form of the movement elements, may have overlapping movement elements or may also be the same with respect to movement elements.

Figure 3:
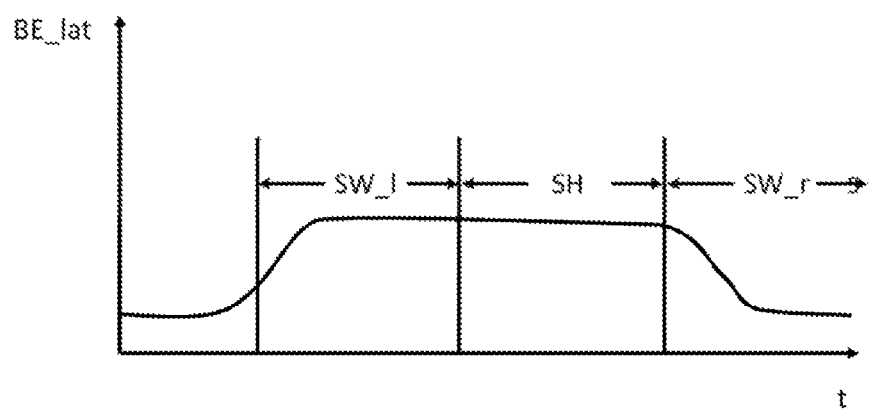
FIG. 3 shows a schematic representation for the description of a movement element, lateral movement, according to the invention.

FIG. 3 illustrates a movement element (BE) of lateral movement (BE_lat) over a chronological progression (t), e.g. for an ego vehicle (Ego). FIG. 3 shows a time curve (t) that represents various changes in the characteristic of the lateral movement (BE_lat). First, a lane change to the left (SW_l) is shown. A lane keeping (SH) is shown in FIG. 3 next. Finally, a lane change to the right (SW_r) is shown. Three segments result for the movement element, lateral movement (BE_lat): lane change to the left (SW_l), lane keeping (SH) and lane change to the right (SW_r). The curve of the segments is incorporated into the movement profile of a traffic participant. In addition, further lateral boundary elements are of course possible according to the invention.

Figure 4:
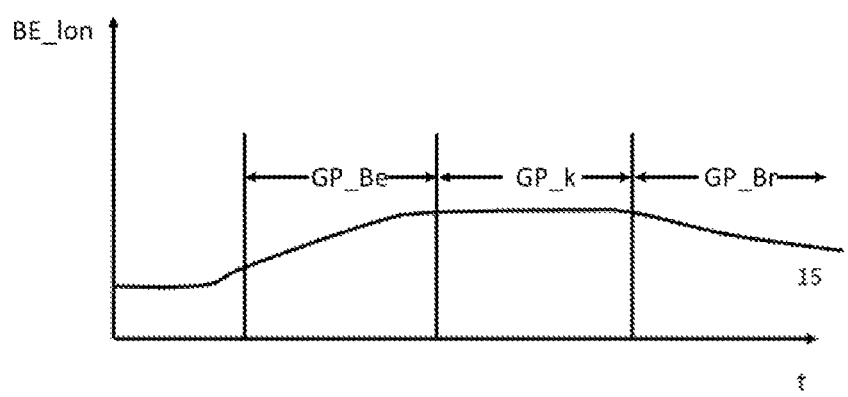
FIG. 4 shows a schematic representation for the description of a movement element, longitudinal movement, according to the invention.

FIG. 4 shows longitudinal movements (BE_lon) of a traffic participant, e.g., an ego vehicle (Ego). The movement element of the longitudinal movement (BE_lon) is influenced by, among other things, speed parameters (GP). FIG. 4 shows a time curve (t) of speed parameters (GP) for this purpose. For this purpose, the speed parameters (GP) are recorded in segments. The first segment represents the speed parameter acceleration (GP_Be). In the second segment as shown in FIG. 4, the ego vehicle maintains a constant speed, so that the speed parameter indicates a constant speed (GP_k). The last segment in FIG. 4 illustrates a braking of the ego vehicle, whereby the speed parameter braking (GP_Br) is shown. These segments are also incorporated into the movement profile of the traffic participant.

Figure 5:
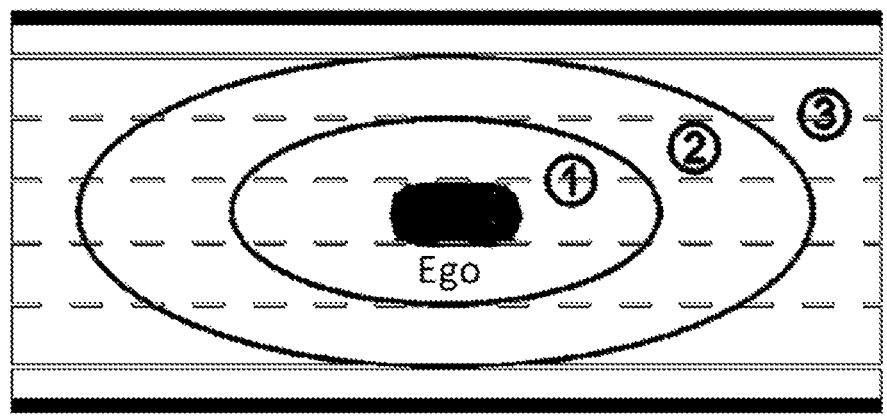
FIG. 5 shows a schematic representation for the description of a movement element, distance parameter, according to the invention.

FIG. 5 shows an advantageous embodiment of the classification of a distance parameter according to the invention. The distance parameter is determined starting from the ego vehicle (Ego) and indicates a distance to fellow vehicles. In FIG. 5, the ego vehicle (Ego) is shown centered in the middle. The distance ranges according to the invention are selected such that fellow vehicles that are in the direct vicinity of the ego vehicle (Ego) are located in Class 1 (1). The range comprises fellow vehicles that are located no more than one lane over from the ego vehicle (Ego) and traveling only at a short distance ahead of or behind the ego vehicle (Ego). In Class 2 (2), there are fellow vehicles that are located at most two lanes over from the ego vehicle (Ego) and are traveling at a medium distance ahead of or behind the ego vehicle (Ego). In the third class (3) are fellow vehicles that are outside the limits of class 2 (2).

Figure 6:
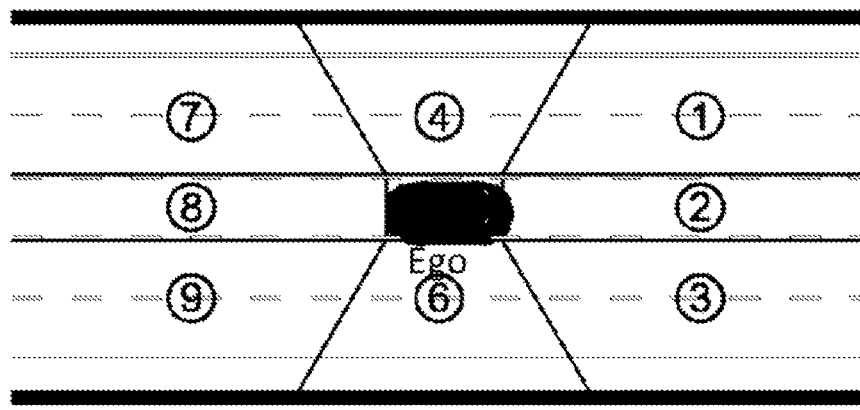
FIG. 6 shows a schematic representation for the description of a movement element, position parameter, according to the invention.

FIG. 6 shows an advantageous embodiment for classifying a position parameter. Comparable to the distance parameter, the position parameter is defined in this embodiment starting from the ego vehicle. The invention comprises further embodiments.

In FIG. 6, the ego vehicle (Ego) is shown in the middle. The position classes (1-8) are selected such that a fellow vehicle that is located directly behind or ahead of the ego vehicle (Ego) is assigned to class 8 or class 2, respectively. If the fellow vehicle is located to the left or right of the ego vehicle (Ego), then it is assigned to class 4 or 6, respectively. The remaining four classes are for the front and rear areas to the left and right of the ego vehicle (Ego).

Since both position and distance parameters indicate a relationship between ego vehicle (Ego) and fellow vehicles ($F_1$-$F_n$), no information about the parameters can be given for a traffic scenario without fellow vehicles.

The progression of the position parameter and distance parameter over time can also be displayed in segments. These parameters, where applicable, then also are incorporated in the movement profile of the traffic participant.

Figure 7:
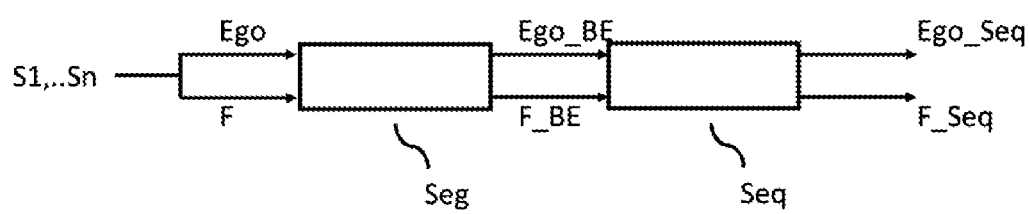
FIG. 7 shows the sequence of a method according to the invention.

FIG. 7 shows a sequence of a method according to the invention. For this purpose, the movement elements (BE) for all fellow vehicles (F) and for the ego vehicle (Ego) are first segmented for each scenario ($S_1$ to $S_n$) to be considered. Changes in the characteristic are then identified and recorded for each movement element. In an embodiment according to the invention, the segmentation of the movement elements (Ego_BE, F_BE) is carried out on the basis of the speed of the vehicle (longitudinal movement), the maneuver performed (lateral movement), the relative distance of the fellow vehicles (F) from the ego vehicle (Ego), and the relative position of the fellow vehicles (F) with respect to the ego vehicle (Ego). A new segment is generated whenever a change is detected in at least one of the movement elements, so that a sequence of segments is produced over the chronological progression.

Based on the segments, sequences (Seq) of the movement elements are then created for each vehicle. For this purpose, the sequence of segments of the movement elements are overlapped, wherein a new sequence segment begins with each new segment. In this way, a sequence-based movement profile is created for each fellow vehicle (F) and for the ego vehicle (Ego).

Figure 8:
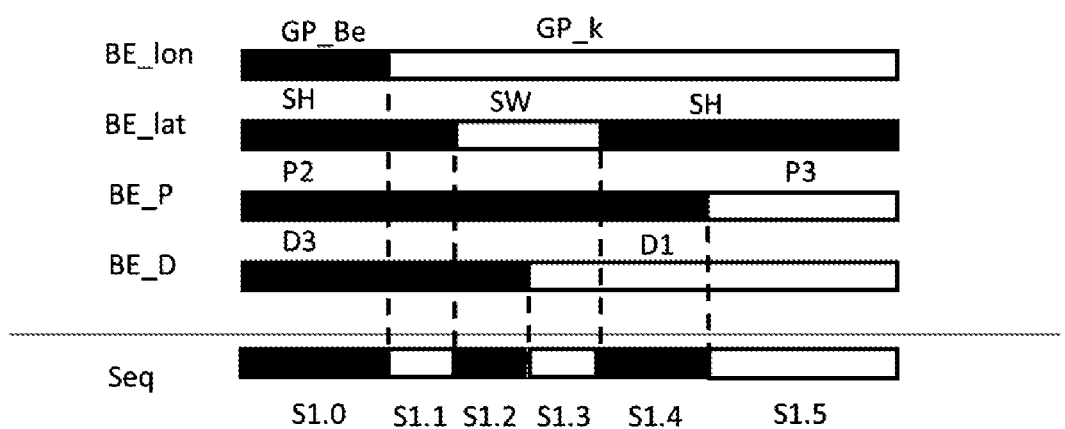
FIG. 8 shows a schematic representation of a segmentation and sequence formation according to the invention.

FIG. 8 shows a schematic representation of the segmentation and sequence formation according to the invention and finally a sequence-based movement profile.

For this purpose, the segments of the movement elements of the longitudinal movement (BE_lon), of the lateral movement (BE_lat), of the position parameter (P) and of the distance parameter (D) are shown together. After the end of the first segment (GP_Be) in the longitudinal movement (BE_lon), a new sequence section of the entire sequence begins. The sequence segment S1.0 is thus concluded and the sequence segment S1.1 begins. After the end of the segment SH in the lateral movement (BE_lat), the sequence section S1.1 ends and S1.2 begins. This procedure is repeated until all segments have been completed in the entire sequence. The resulting sequence (Seq) is shown in the last horizontal bar of FIG. 8.

On the basis of the sequences of the traffic participants, the normalized weighted edit distance can then be applied, for example, in order to determine the similarity between scenarios. The similarity between two sequences of a traffic scenario is calculated as a minimum sum of edit operations necessary to convert a sequence of a traffic scenario into another sequence of another traffic scenario, wherein edit operations includes at least delete and/or move and/or insert operations.

When extracting scenarios from real measurement data, a distinction is also made between static and dynamic objects. In order to transfer the dynamic objects into a simulation scenario, first an object detection in camera images and/or the point cloud of a lidar system (light detection and ranging) is carried out and then their trajectory over the entire course is extracted using, e.g., machine learning methods. Elements of the static environment such as the road or road signs, can thus also be extracted from the real measurement data or generated directly from existing map data. Finally, the dynamic objects and their trajectories are referenced to the static environment.

Thus, the trajectories to be considered according to the invention, as well as the motion profiles, are real driving maneuvers obtained from real measurement data, which ultimately result in the scenarios to be compared.

If similarities between these scenarios are determined, time and effort can be saved in the acquisition of further scenarios. In addition, a suitable selection of scenarios can be used to determine which scenarios should be used for virtual simulations. This can also be used to optimize a testing process.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method, comprising:
   obtaining, by a test device, a plurality of sequences corresponding to a plurality of traffic scenarios, wherein each sequence of the plurality of sequences contains a plurality of segments, wherein each segment of the plurality of segments of a respective sequence contains a combination of parameters corresponding to a movement profile of a vehicle, and wherein consecutive segments of a respective sequence of the plurality of sequences are different from one another with respect to at least one parameter value;
   determining, by the test device, measures of similarity between traffic scenarios of the plurality of traffic scenarios by comparing respective sequences of the plurality of sequences; and
   selecting, by the test device, a subset of traffic scenarios of the plurality of traffic scenarios to be used for virtual testing of one or more components of an autonomous vehicle based on the determined measures of similarity;
   wherein the combination of parameters includes two or more of the following:
   a lateral movement parameter indicative of a lane change being performed;
   a longitudinal movement parameter indicative of vehicle speed;
   a distance parameter indicative of distances of one or more other vehicles relative to an ego vehicle; or
   a position parameter indicative of positions of one or more other vehicles relative to an ego vehicle.

2. The method according to claim 1, wherein each sequence includes a chronological progression of segments, including changes in at least one parameter of the combination of parameters from one segment to a next segment.

3. The method according to claim 1, wherein a new segment is generated based on a change being determined in at least one parameter of the combination of parameters.

4. The method according to claim 1, wherein a respective measure of similarity is determined by comparing respective sequences using a normalized weighted edit distance, wherein the respective measure of similarity between a first sequence and a second sequence is calculated as a minimum sum of edit operations for converting the first sequence into the second sequence, wherein the edit operations include delete and/or move and/or insert operations.

5. The method according to claim 4, wherein the calculation of a minimum sum of edit operations takes into account a cost associated with carrying out a delete operation or an insert operation.

6. The method according to claim 5, wherein the following difference equation is defined for the edit distance:

$$D(i, j) = \min \begin{cases} D(i-1, j) + d(S_{1,i-1}, S_{1,i}) + \lambda & \text{Deletion} \\ D(i, j-1) + d(S_{2,j-1}, S_{2,j}) + \lambda & \text{Insertion} \\ D(i-1, j-1) + d(S_{1,i-1}, S_{2,j-1}) & \text{Replacement} \end{cases}$$

where $S_{n,i}$ and $S_{n,j}$ correspond to respective states of respective sequences, (i,) is an element of a table in which intermediate results of calculating costs of edit operations between two states i and j of the two sequences are stored, and $\lambda$ corresponds to costs that arise from carrying out a delete or insert operation.

7. The method according to claim 6, wherein the following function is used for calculating the costs of edit operations between the two states Si and S'j of the two sequences:

$$d(Si,S'j) = wMa*dMa(Si,S'j) + wGe*dGe(Si,S'j) + wDi*dDi(Si,S'j) + wPo*dPo(Si,S'j)$$

where the function is a weighted sum of the costs that are generated between individual classes of two respective states, and where dMa, dGe, dDi, and dPo correspond to respective parameters of the combination of parameters.

8. A test device, comprising:
   a processor; and
   a memory having processor-executable instructions stored thereon;
   wherein the processor is configured to execute the processor-executable instructions to cause the test device to perform the following:
   obtaining a plurality of sequences corresponding to a plurality of traffic scenarios, wherein each sequence of the plurality of sequences contains a plurality of segments, wherein each segment of the plurality of segments of a respective sequence contains a combination of parameters corresponding to a movement profile of a vehicle, and wherein consecutive segments of a respective sequence of the plurality of sequences are different from one another with respect to at least one parameter value;

determining measures of similarity between traffic scenarios of the plurality of traffic scenarios by comparing respective sequences of the plurality of sequences; and selecting, by the test device, a subset of traffic scenarios of the plurality of traffic scenarios to be used for virtual testing of one or more components of an autonomous vehicle based on the determined measures of similarity;

wherein the combination of parameters includes two or more of the following:
- a lateral movement parameter indicative of a lane change being performed;
- a longitudinal movement parameter indicative of vehicle speed;
- a distance parameter indicative of distances of one or more other vehicles relative to an ego vehicle; or
- a position parameter indicative of positions of one or more other vehicles relative to an ego vehicle.

9. The test device according to claim 8, wherein the test device is formed by a control unit and is configured to use scenarios based on virtual tests, real tests, and/or measurement data.

10. A non-transitory computer-readable medium having processor-executable instructions stored thereon, wherein the processor-executable instructions, when executed, facilitate:

obtaining, by a test device, a plurality of sequences corresponding to a plurality of traffic scenarios, wherein each sequence of the plurality of sequences contains a plurality of segments, wherein each segment of the plurality of segments of a respective sequence contains a combination of parameters corresponding to a movement profile of a vehicle, and wherein consecutive segments of a respective sequence of the plurality of sequences are different from one another with respect to at least one parameter value;

determining, by the test device, measures of similarity between traffic scenarios of the plurality of traffic scenarios by comparing respective sequences of the plurality of sequences; and selecting, by the test device, a subset of traffic scenarios of the plurality of traffic scenarios to be used for virtual testing of one or more components of an autonomous vehicle based on the determined measures of similarity;

wherein the combination of parameters includes two or more of the following:
- a lateral movement parameter indicative of a lane change being performed;
- a longitudinal movement parameter indicative of vehicle speed;
- a distance parameter indicative of distances of one or more other vehicles relative to an ego vehicle; or
- a position parameter indicative of positions of one or more other vehicles relative to an ego vehicle.

* * * * *